United States Patent
Muller et al.

[11] Patent Number: 5,667,847
[45] Date of Patent: Sep. 16, 1997

[54] PROCESS FOR THE PRODUCTION OF A MULTICOAT PROTECTIVE AND/OR DECORATIVE COATING AND WATER-DILUTABLE COATING COMPOSITIONS

[75] Inventors: Bodo Muller; Eric Martin, both of Wurzburg, Germany

[73] Assignee: BASF Lacke+Farben Aktiengesellschaft, Munster, Germany

[21] Appl. No.: 58,818

[22] Filed: May 10, 1993

Related U.S. Application Data

[63] Continuation of Ser. No. 458,719, filed as PCT/EP88/00624, Jul. 11, 1988 published as WO89/00891, Feb. 9, 1989, abandoned.

[30] Foreign Application Priority Data

Jul. 31, 1987 [DE] Germany ............... 37 25 371.9

[51] Int. Cl.$^6$ ............... B05D 1/36; B05D 7/24; C09D 5/38; C09D 105/00
[52] U.S. Cl. ............... 427/385.5; 428/327; 428/402; 524/401; 524/55; 525/54.3
[58] Field of Search ............... 524/55, 401; 427/372.2, 427/384, 385.5, 389.9; 428/327, 402; 525/54.3

[56] References Cited

U.S. PATENT DOCUMENTS

| | | | |
|---|---|---|---|
| 3,970,482 | 7/1976 | Gunn | 106/1.05 |
| 4,148,970 | 4/1979 | McIntosh et al. | 428/469 |
| 4,408,008 | 10/1983 | Markusch | 524/591 |
| 4,558,090 | 12/1985 | Drexler et al. | 524/591 |
| 4,755,229 | 7/1988 | Armanini | 106/413 |
| 4,761,442 | 8/1988 | Jenal | 524/56 |
| 4,945,128 | 7/1990 | Hille et al. | 524/591 |
| 4,978,708 | 12/1990 | Fowler et al. | 524/507 |

FOREIGN PATENT DOCUMENTS

| | | |
|---|---|---|
| 0 038 127 | 10/1981 | European Pat. Off. |
| 3725371.9 | 7/1988 | Germany |
| WO87/05305 | 9/1987 | WIPO |
| PCT/EP/ 8800624 | 9/1989 | WIPO |

Primary Examiner—Jeffrey C. Mullis
Attorney, Agent, or Firm—Kenyon & Kenyon

[57] ABSTRACT

The invention relates to a process for the production of a multicoat coating of the basecoat/clearcoat type using a water-dilutable basecoat composition. The process comprises a basecoat composition which contains 0.1 to 4.0% by weight, based on the binder solids, of xanthan gum and 5 to 80% by weight, based on the binder solids, of crosslinked polymeric microparticles prepared from polyester polyols and polyisocyanates.

21 Claims, No Drawings

PROCESS FOR THE PRODUCTION OF A MULTICOAT PROTECTIVE AND/OR DECORATIVE COATING AND WATER-DILUTABLE COATING COMPOSITIONS

This is a continuation of application Ser. No. 07/458,719, filed as PCT-EP-88/00624, Jul. 11, 1988, published as WO89/00891, Feb. 9, 1989, now abandoned.

The invention relates to a process for the production of a multicoat protective and/or decorative coating on a substrate surface, wherein (1) a pseudoplastic and/or thixotropic water-dilutable basecoat composition is applied as basecoat composition, this basecoat composition containing water, organic solvents if appropriate, a water-dilutable binder, crosslinked polymeric microparticles with a diameter of 0.01 to 10 μm, pigment particles and a thickener, (2) a polymeric film is formed on the surface from the composition applied in stage (1), (3) a suitable transparent topcoat composition is applied to the base-coat obtained in this manner, and subsequently (4) the basecoat and topcoat are baked together.

In automotive finishing in particular, but also in other areas which require coatings providing good decorative effect and at the same time good corrosion protection, it is known to provide substrates with several successive coatings.

Multicoat coatings are preferably applied by the so-called "basecoat/clearcoat" process, i.e. a pigmented basecoat is applied first, followed by a clearcoat after a brief flash-off period without a baking stage (wet-on-wet process). Basecoat and clearcoat are subsequently baked together.

The basecoat/clearcoat process has gained particularly high importance in the application of automotive metallic paints.

Economic and environmental reasons have led to attempts to use aqueous basecoat compositions in the production of multicoat coatings.

The coating compositions for the production of these basecoats must be capable of being processed by the efficient wet-on-wet process which is customary today, i.e. they must be coatable by a transparent topcoat after a pre-drying period, to be as short as possible, without a baking stage, without showing any peeling and "strike-in" phenomena.

Furthermore, the development of coating compositions for the production of basecoats for metallic paints of the basecoat/clearcoat type requires that further problems are solved. The metallic effect depends decisively on the orientation of the metallic pigment particles in the paint film. Accordingly, a metallic basecoat capable of being processed by the wet-on-wet process must produce paint films in which the metallic pigments are present in a favorable spatial orientation after being applied and in which this orientation becomes rapidly fixed so that it cannot be disturbed in the course of further painting processes.

EP-A-38,127 discloses a process for the production of multicoat coatings of the basecoat/clearcoat type in which aqueous basecoat compositions containing stably dispersed, crosslinked polymeric microparticles and possessing pseudoplastic or thixotropic characteristics, are used.

EP-A-38,127 preferably uses polymeric micro-particles consisting of crosslinked polyacrylates. However, polymeric microparticles consisting of crosslinked polycondensates, such as, for example, crosslinked polyester microparticles, are also said to be usable.

It has been discovered, however, that incorporation of the polymeric microparticles recommended in EP-A-38,127 in basecoat compositions often leads to incompatibility phenomena. These incompatibility phenomena can be attributed to undesirable reciprocal effects between the polymeric microparticles and other paint constituents, in particular to undesirable reciprocal effects between the polymeric microparticles and binder components.

For example, if the refractive index of the cross-linked polymeric microparticles is not carefully harmonized with the refractive index of the other binder components, opaque paint films result owing to light scattering effects.

The above incompatibility phenomena become especially marked in the case of aqueous coating compositions which contain polyurethanes as binders. Coating compositions of this type are described in U.S. Pat. Nos. 4,423,179, 4,558,090 and German Offenlegungsschrift 3,545,618.

EP-A-38,127 recommends the addition to the aqueous basecoat compositions of such water-soluble polymers (so-called thickeners) as impart pseudoplastic and/or thixotropic properties to the basecoat composition.

The person skilled in the art has at his disposal a very large number of various thickeners by means of which he can impart the required theological properties to the aqueous basecoat compositions. However, the addition of the thickeners gives rise to incompatibility phenomena and/or to more moisture-sensitive films and/or to impaired metallic effects and/or to adhesion defects. These short-comings are particularly marked in aqueous coating compositions which contain polyurethanes as binders.

The object on which the present invention is based is to make available a novel process according to the preamble of the first patent claim. The problems of the state of the art outlined above are intended to be overcome or reduced with the aid of this novel process.

Surprisingly, this object is achieved by a process according to the preamble of the first patent claim, wherein the basecoat composition contains 0.1 to 4.0% by weight, preferably 1.0 to 2.0% by weight, based on the binder solids, of xanthan gum and 5 to 80% by weight, preferably 30 to 70% by weight, particularly preferably 40 to 60% by weight, based on the binder solids, of crosslinked polymeric microparticles, in which the crosslinked polymeric microparticles are obtainable (a) by dispersing a mixture of a component (A) and a component (B) in an aqueous medium, wherein
the component (A) consists of one or more polyester polyol(s) containing at least two hydroxyl groups and
the component (B) consists of one or more optionally blocked polyisocyanate compound(s),
the components (A) and/or (B) possessing a sufficient number of ionic groups to form a stable dispersion and at least a part of the components (A) and/or (B) containing more than two hydroxyl or optionally blocked isocyanate groups per molecule, and (b) by subsequently heating the resultant dispersion to a temperature high enough for the components (A) and (B) to react with the formation of crosslinked polymeric microparticles.

The advantages achieved by the invention lie essentially in the fact that the crosslinked polymeric micro-particles used according to the invention can be adapted by simple means to the special requirements of the aqueous basecoat compositions and that no imcompatibility phenomena occur when the crosslinked polymeric microparticles are incorporated in aqueous basecoat compositions, especially in those which contain a mixture of a melamine resin and a polyester resin as binder. Surprisingly, neither sensitivity to moisture nor adhesion properties nor metallic effect of the resultant films are negatively influenced when xanthan gum is used as thickener. On the contrary, the use of xanthan gum allows the application of basecoats with a very low solids content (10 to 20% by weight), which has a positive influence on the metallic effect of the resultant coatings. Last but not least, no incompatibility phenomena are encountered when xanthan gum is incorporated in aqueous basecoat compositions, particularly in those which contain a mixture of a melamine resin and a polyester resin as binder.

It was surprising and in no way foreseeable that of the very large number of various thickeners available for aqueous paint systems, it was xanthan gum in particular that shows the positive effects referred to above.

The first stage of the process according to the invention consists of the application of a pseudoplastic and/or thixotropic water-dilutable basecoat composition.

The individual components of the basecoat compositions used according to the invention are explained in greater detail below.

Liquid diluent

The basecoat compositions used according to the invention contain as liquid diluent water which may also contain organic solvents if appropriate. The proportion of organic solvents is kept as low as possible.

Examples of solvents which may be present in water, are heterocyclic, aliphatic or aromatic hydrocarbons, mono- or polyhydric alcohols, ethers, glycol ethers, esters, amides and ketones, such as, for example, N-methylpyrrolidone, dimethylformamide, toluene, xylene, butanol, ethylglycol and butylglycol as well as their acetates, butyldiglycol, diethylene glycol dimethyl ether, cyclohexanone, methyl ethyl ketone, acetone, isophorone or mixtures thereof.

Water-dilutable binder

The basecoat compositions used according to the invention may in principle contain any of the water-dilutable binders and mixtures of these binders which are suitable for the purpose under discussion. (By the term "water-dilutable binders" are understood all binder components exclusive of the crosslinked polymeric micro-particles. On the other hand, binder solids refer to the total of water-dilutable binders and crosslinked polymeric microparticles.)

Examples of water-dilutable binders which can be used, are water-dilutable melamine resins, water-dilutable polyester resins, water-dilutable polyacrylate resins, water-dilutable polyethers and water-dilutable polyurethane resins.

Water-dilutable melamine resins are known per se and its use is widespread. They are in general etherified melamine/formaldehyde condensation products. Apart from the degree of condensation which should be as low as possible, their water-solubility depends on the etherification components, only the lowest members of the alkanol mono-ether series and ethylene glycol monoether series giving rise to water-soluble condensates. Melamine resins etherified with methanol have the greatest significance. If solubilizers are used, even melamine resins etherified with butanol may be dispersed in the aqueous phase.

There is also the possibility of introducing carboxyl groups in the condensate. Transetherification products of highly etherified formaldehyde condensates with hydroxycarboxylic acids are water-soluble via their carboxyl group after neutralization and may form part of the basecoat compositions used according to the invention.

Other water-soluble or water-dispersible amino resins such as, for example, urea resins, may be used instead of the melamine resins described.

Polyester resins carrying hydroxyl groups are preferably used as water-dilutable polyester resins. The polyester resins used according to the invention preferably contain carboxylate groups as the solubilizing groups.

Water-dilutable polyester resins of the type described above are known per se and can be prepared by reacting polyhydric polyols with polycarboxylic acids or polycarboxylic anhydrides.

Polyester resins with a mean functionality of 2.5 to 10 per molecule and with a mean degree of condensation from 10 to 25 per molecule are preferably used. The degree of condensation indicates the total of the monomeric units in the chain of the polymer molecule.

The polyester resins used preferably possess a maximum acid value of 30 and a maximum hydroxyl value of 150.

The acid components preferred for the synthesis of the polyester resins are aliphatic, cycloaliphatic saturated or unsaturated and/or aromatic polybasic carboxylic acids, preferably di-, tri- and tetracarboxylic acids of 2 to 14, preferably 4 to 12 carbon atoms per molecule, or their derivatives capable of esterification (for example anhydrides or esters), for example phthalic anhydride, isophthalic acid, terephthalic acid, tetrahydro- and hexahydrophthalic anhydride, endomethylenetetrahydrophthalic acid, succinic acid, glutaric acid, sebacic acid, azelaic acid, trimellitic acid and trimellitic anhydride, pyromellitic anhydride, fumaric acid and maleic acid. Phthalic anhydride is the most widely used acid component. The polyester resin should not contain more than 20 mols %, based on the polycarboxylic acid radicals condensed within the molecule, of fumaric and maleic acid radicals.

The polyols preferred for the synthesis of the polyesters are aliphatic, cycloaliphatic and/or araliphatic alcohols of 1 to 15, preferably of 2 to 6 carbon atoms, and 1 to 6, preferably 1 to 4 OH groups attached to non-aromatic carbon atoms per molecule, for example glycols such as ethylene glycol, propane-1,2- and propane-1,3-diol, butane-1,2-, -1,3- and -1,4-diol, 2-ethylpropane-1,3-diol, 2-ethylhexane-1,3-diol, neopentyl glycol, 2,2-trimethylpentane-1,3-diol, hexane-1,6-diol, cyclohexane-1,2- and -1,4-diol, 1,2- and 1,4-bis(hydroxymethyl) cyclohexane, bis(ethylene glycol) adipate; ether alcohols such as diethylene and triethylene glycol, dipropylene glycol; dimethylolpropionic acid, oxalkylated bisphenols having two $C_2$–$C_3$-hydroxyalkyl groups per molecule, perhydrogenated bisphenols; butane-1,2,4-triol, hexane-1,2,6-triol, trimethylolethane, trimethylolpropane, trimethylolhexane, glycerol, pentaerythritol, dipentaerythritol, mannitol and sorbitol; chain-terminating monohydric alcohols of 1 to 8 carbon atoms such as propanol, butanol, cyclohexanol and benzyl alcohol, hydroxypivalic acid. The most widely used alcohols are glycerol, trimethylolpropane, neopentyl glycol and pentaerythritol.

The polyester resins to be used according to the invention may also be modified with monocarboxylic acid and monohydric alcohols.

Examples of monocarboxylic acids are saturated or unsaturated fatty acids, benzoic acid, p-tert.-butylbenzoic acid, hexahydrobenzoic acid and abletic acid.

Examples of monohydric alcohols are methanol, propanol, cyclohexanol, 2-ethylhexanol and benzyl alcohol.

It is also possible to replace up to 25% of the ester bonds by urethane bonds.

Preferred polyacrylate resins are obtained by copolymerization of vinyl and vinylidene monomers, such as, for example, styrene, α-methylstyrene, o- and p-chlorostyrene, o-, m- or p-methylstyrene, p-tert.-butylstyrene, (meth) acrylic acid, (meth)acrylonitrile, alkyl acrylates and methacrylates of 1 to 8 carbon atoms in the alcohol component, for example ethyl acrylate, methyl acrylate, n-propyl acrylate and isopropyl acrylate, n-butyl acrylate, 2-ethylhexyl acrylate, 2-ethylhexyl methacrylate, isooctyl acrylate, tert.-butyl acrylate, methyl methacrylate, ethyl methacrylate, n-propyl and isopropyl methacrylate, butyl methacrylate, isooctyl methacrylate and mixtures thereof if desired; hydroxyalkyl (meth)acrylates of 2 to 4 carbon atoms in the alkyl group, for example 2-hydroxyethyl (meth)acrylate, 2-hydroxypropyl (meth)acrylate, 4-hydroxy-butyl (meth) acrylate, trimethylolpropane mono(meth)acrylate, pentaerythritol mono(meth)acrylate and their esters with fatty acid, diesters of fumaric acid, itaconic acid, maleic acid of 4 to 8 carbon atoms in the alcohol component; acrylonitrile, (meth)acrylamide, vinyl esters of alkanemonocarboxylic acids of 2 to 5 carbon atoms such as vinyl acetate or vinyl propionate or mixtures of the said monomers, N-methoxymethyl-(meth)acrylamide.

Preferred monomers are styrene and alkyl (meth)acrylates of 1 to 8 carbon atoms in the alcohol component, the esterification product of fatty acid and hydroxyalkylacrylates and their mixtures.

Examples of water-dilutable polyethers are linear or branched poly(oxypropylene) glycols with a mean molecular weight of/+400 to 1000, preferably 600 to 900.

Water-dilutable polyurethane resins preferably used are the polyurethane resins disclosed in German Offenlegungsschrift 3,545,618 and U.S. Pat. No. 4,423,179.

Basecoat compositions which contain as water-dilutable binder a mixture of a water-dilutable melamine resin and a water-dilutable polyester resin, are very particularly preferably used.

Particularly preferred basecoat compositions are obtained when the proportion of the melamine resin, based on the proportion of the crosslinked polymeric micro-particles used according to the invention, is 1 to 80% by weight, preferably 30 to 70% by weight, and if the weight ratio of melamine resin to polyester resin is 2:1 to 1:4.

The basecoat compositions used according to the invention may also contain blocked polyisocyanates as crosslinking agents.

The basecoat compositions used in the process according to the invention preferably contain 2 to 15% by weight, particularly preferably 5 to 13% by weight, of water-dilutable binder components. (The term water-dilutable binder components is understood to mean any binder components except the crosslinked polymeric micro-particles used according to the invention.)

Crosslinked polymeric microparticles

The basecoat compositions used in the process according to the invention contain crosslinked polymeric microparticles which are obtainable (a) by dispersing a mixture of a component (A) and a component (B) in an aqueous medium, wherein
the component (A) consists of one or more polyester polyol(s) containing at least two hydroxyl groups and
the component (B) consists of one or more optionally blocked polyisocyanate compound(s),
the components (A) and/or (B) possessing a sufficient number of ionic groups to form a stable dispersion and at least a part of the components (A) and/or (B) containing more than two hydroxyl or optionally blocked isocyanate groups per molecule, and (b) by subsequently heating the resultant dispersion to a temperature high enough for the components (A) and (B) to react with the formation of crosslinked polymeric microparticles.

The polymeric microparticles used according to the invention preferably have a diameter which is less than 1 µm, particularly preferably between 0.05 to 0.2 µm.

The particle size of the crosslinked polymeric microparticles can be influenced by simple means (for example by the amount of ionic groups contained in the starting components (A) and (B).

While with polymeric microparticles based on vinyl monomers it is essentially always possible only to modify the polymeric side chains, with the polymeric microparticles used according to the invention it is possible to influence the lattice structure of the particles by selective incorporation of certain chain segments. The polymeric microparticles used according to the invention may be optimally harmonized by simple means with the components contained in the basecoat compositions, in particular the binder components. This advantage has a bearing particularly on those basecoat compositions which contain melamine resins and polyesters as binder components. However, it is also possible to achieve with other binder systems results that are often better than those achievable with microparticles based on acrylic polymers as the only microparticle component.

In some cases it has been found advantageous to admix to the coating compositions according to the invention also microparticles based on acrylic polymers, in addition to the polymeric microparticles described above.

The first stage in the production of the polymeric microparticles used according to the invention consists in the preparation of a mixture of the components (A) and (B), care being taken that the component (A) and/or the component (B) possess a sufficient number of ionic groups, preferably carboxylate groups, to form a stable dispersion and at least a part of the components (A) and/or (B) contain more than two hydroxyl or isocyanate groups per molecule.

The term stable dispersion means dispersions in which the dispersed particles coagulate to a relatively large extent only after the application and removal of the dispersion medium.

In some cases it may be useful to incorporate in the components (A) and/or (B), in addition to ionic groups, further stabilizing groups, such as, for example, polyoxyalkylene groups.

Stabilization may be carried out both anionically and cationically, the anionic stabilization, preferably via carboxylate groups, being preferred. The determination of the optimum concentration of ionic groups in the components (A) and/or (B) necessary for the formation of a stable dispersion, may be carried out by the average person skilled in the art by means of simple routine tests. The concentration of ionic groups necessary for the form- ation of a stable dispersion is usually between 0.01 to 2 milliequivalents per gram of the components (A) and/or (B).

Neutralization of the groups capable of salt formation with the aid of bases or acids is preferably carried out shortly before or during the dispersion of the mixture of the components (A) and (B) in the aqueous dispersion medium.

Particularly suitable groups capable of salt formation are carboxylic and sulfonic acid groups. These groups are preferably neutralized by means of a tertiary amine.

The content of ionic groups or the degree of neutralization of groups suitable for salt formation is an important parameter capable of controlling the size of the resultant crosslinked polymeric microparticles.

In the preparation of the mixture of the components (A) and (B), care must be taken that no precross-linking reactions occur between the components (A) and (B) in the aqueous dispersion medium prior to the dispersion of the mixture.

The component (A) consists of one or more polyester polyols containing at least two hydroxyl groups.

Examples of suitable polyester polyols are particularly reaction products of polyhydric polyols with polycarboxylic acids or polycarboxylic anhydrides, known per se in polyurethane chemistry.

Suitable polyols for the production of the polyester polyols are for example ethylene glycol, propane-1,2- and -1,3-diol, butane-1,3- and -1,4-diol, the isomeric pentanediols, hexanediols or octanediols, such as, for example, 2-ethylhexane-1,3-diol, trimethylolpropane, glycerol, bishydroxymethylcyclohexane, erythritol, meso-erythritol, arabitol, adonitol, xylitol, mannitol, sorbitol, dulcitol, hexanetriol, (poly)pentaerythritol etc.

The polycarboxylic acids suitable for the production of the polyester polyols consists principally of low-molecular polycarboxylic acids or their anhydrides having 2 to 18 carbon atoms in the molecule.

The preferred acids used are dicarboxylic and tricarboxylic acids.

Examples of suitable acids are oxalic acid, succinic acid, fumaric acid, phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid, tetrachlorophthalic acid and trimellitic acid. Instead of these acids it is also possible to use their anhyddrides, provided these exist.

Polyester polyols which have been prepared by polymerization of lactones, may also be used as component (A).

Particularly good results are obtained with polyester polyols each of whose molecules contains on average one carboxylate group and at least two, preferably more than two, hydroxyl groups.

The (B) components used are preferably those which are free from ionic groups.

The (A) component is preferably selected so that it can be stably dispersed on its own in the aqueous medium. The relationships between the structure of polyester polyols (acid value, molecular weight . . . ) and their dispersion characteristics are well known to the average person skilled in the art who is able to select the optimum polyester polyol component for the solution of any particular problem with the aid of a few orientation preliminary tests.

It is also possible to add to the polyester polyol used as (A) component further compounds which contain groups reactive toward isocyanate groups. In this process, great care must be taken that the mixture formed from the components remains stably dispersible in the aqueous medium and that the crosslinked polymeric microparticles formed from this dispersion possess the desired size.

Examples of compounds which can be added to the polyester polyols forming the component (A), are the polyether polyols known per se in polyurethane chemistry.

Polyisocyanate compounds whose isocyanate groups may be present at least in part in blocked form, are used as component (B).

Examples which may be mentioned are: trimethylenediisocyanate, tetramethylenediisocyanate, pentamethylenediisocyanate, hexamethylenediisocyanate, ethylethylenediisocyanate, 2,3-dimethylethylenediisocyanate, 1-methyltrimethylenediisocyanate, 1,3-cyclopentylenediisocyanate, 1,4-cyclohexylenediisocyanate, 1,2-cyclohexylenediisocyanate, 1,3-phenylenediisocyanate, 1,4-phenylenediisocyanate, 2,4-toluylenediisocyanate, 2,6-toluylenediisocyanate, 4,4-biphenylenediisocyanate, 1,5-naphthylenediisocyanate, 1,4-naphthylenediisocyanate, 1-isocyanatomethyl-5-isocyanato-1,3,3-trimethylcyclohexane etc.

It is also possible to use prepolymers containing isocyanate groups as polyisocyanate components.

In principle, any of the blocking agents known from isocyanate chemistry may be used as blocking agent.

However, very particularly preferred blocking agents are the diesters of malonic acid with $C_1$–$C_8$-alkanols such as methanol, ethanol, n-propanol, n-butanol, isobutanol, n-hexanol, n-octanol or isooctanol, or with cycloaliphatic alcohols, such as cyclopentanol or cyclohexanol, as well as with arylaliphatic alcohols, such as benzyl alcohol or 2-phenylethanol.

Among the diesters of malonic acid, diethyl malonate is used as the blocking agent which is very particularly preferred.

Polyisocyanate components whose isocyanate groups are attached to (cyclo)aliphatic radicals, are preferably used. Polyisocyanate compounds which contain isocyanate groups attached to aromatic groups, may be used only in exceptional cases on account of their high reactivity toward water (for example as part components of the component (B)).

The mole ratio of components (A) and (B) and the number of the groups contained in the components (A) and (B) which are reactive toward isocyanate groups or of optionally blocked isocyanate groups, as well as the reaction conditions selected for the preparation of the crosslinked polymeric microparticles, can influence the crosslinking density of the resultant polymeric microparticles.

The crosslinking density in turn correlates with the swelling characteristics of the polymeric micro-particles.

The swelling characteristics of the polymeric microparticles can be also regulated via the chemical nature of the components (A) and (B) (incorporation of more or less hydrophilic molecular segments; incorporation of more or less rigid molecular parts).

Mixtures of the components (A) and (B) which are particularly preferred, consist of polyester polyols each of whose molecules carry on average one carboxyl group and at least 3 hydroxyl groups, and of triisocyanate compounds whose isocyanate groups are attached to (cyclo)aliphatic aliphatic radicals and are optionally blocked, at least in part, with malonic acid diesters, preferably diethyl malonate.

The mixture consisting of the components (A) and (B) can essentially be dispersed in the aqueous dispersion medium.

It is more advantageous, however, to dissolve or disperse the components (A) and (B) in a water-miscible organic solvent which boils preferably below 100° C. and which is inert toward isocyanate groups, and subsequently to disperse this solution or dispersion in the aqueous dispersion medium. In principle, any water-miscible organic solvent which is inert toward isocyanate groups, may be used as solvent or dispersant for the mixture consisting of the components (A) and (B).

Advantageously, organic solvents boiling below 100° C. are used. Particularly good results may be obtained with acetone and methyl ethyl ketone.

The aqueous dispersion medium in which the mixture of (A) and (B) is dispersed, consists of water which may also contain an organic solvent.

The transfer of the mixture consisting of (A) and (B) in the aqueous dispersion medium results in a stable aqueous dispersion consisting of particles whose size may be influenced by selective variation of the parameters discussed above. Subsequently the resultant dispersion is heated to a temperature high enough (in general from 60° to 95° C.) for the components (A) and (B) to react with the formation of crosslinked polymeric microparticles.

The organic solvent used for dispersing or dissolving the mixture consisting of the components (A) and (B) can be distilled off, if appropriate in vacuo, prior to the reaction of the components (A) and (B), at a temperature which lies below the reaction temperature necessary for the formation of crosslinked polymeric microparticles; however, it is also possible to distil off the organic solvent in the course of the crosslinking reaction.

The polymeric microparticles used according to the invention are very particularly preferably prepared (1) by dispersing a mixture of the components (A) and (B) in an aqueous medium, wherein the component (A) consists of polyester polyols each of whose molecules carries on average one carboxylate group and at least two, preferably more than two, hydroxyl groups, and the component (B) consists of polyisocyanate compounds which preferably contain more than two optionally blocked isocyanate groups attached to (cyclo)aliphatic radicals, and wherein the mixture of the components (A) and (B) is dissolved or dispersed in a water-miscible organic solvent which boils below 100° C. and is inert towards isocyanate groups, preferably acetone and/or methyl ethyl ketone, and (2) by subsequently heating the resultant dispersion to a temperature high enough for the components (A) and (B) to react with the formation of crosslinked polymeric microparticles.

Aqueous dispersions containing crosslinked polymeric microparticles obtained in this manner may be readily incorporated in the aqueous basecoat compositions used according to the invention.

The basecoat compositions used according to the invention preferably contain 2 to 15% by weight, particularly preferably 5 to 13% by weight, of crosslinked polymeric microparticles of the type described above. The proportion of crosslinked polymeric microparticles is 5 to 80% by weight, preferably 30 to 70% by weight, particularly preferably 40 to 60% by weight, based on binder solids.

The term "binder solids" is understood to mean the total proportion of water-dilutable binder and crosslinked polymeric microparticles. In other words, the binder solids are calculated by adding together the proportion of water-dilutable binder and the proportion of crosslinked polymeric microparticles.

The binder solids of the basecoat compositions used according to the invention preferably amount to 5 to 30% by weight, particularly preferably to 10 to 25% by weight.

Pigments

The basecoat compositions used according to the invention may contain any of the pigments suitable for the basecoat/clearcoat process. Examples are titanium dioxide, graphite, carbon black, phthalocyanine blue, chromium oxide, perylenetetracarboxylic acid imides and the like.

The basecoat compositions used according to the invention contain very particularly preferably metallic pigments, particularly preferably aluminum pigments. The metallic pigments may also be used in conjunction with color pigments. In this case the type and amount of the color pigment is selected so that the desired metallic effect is not suppressed.

The basecoat compositions used according to the invention may also contain, instead of or in combination with metallic pigments, other effect pigments, such as, for example, micaceous pigments coated with metal oxides (so-called mica).

The content of metallic pigments of the basecoat composition used according to the invention, is up to 25% by weight, preferably 12 to 18% by weight, based on the binder solids.

Thickeners

The basecoat compositions used according to the invention contain 0.1 to 4.0% by weight, preferably 1.0 to 2.0% by weight, based on the binder solids, of xanthan gum as thickener.

Xanthan gum is a generally known thickener also used in aqueous coating compositions, particularly in latex paints. In view of the large number of thickeners of the most varied type, it was surprising and not at all foreseeable that the problems described at the outset may be solved using xanthan gum in particular.

Xanthan gum is a high-polymeric heteropolysaccharide (molecular mass about 2 million), derived from the bacterial strain *Xanthomonas campestris* and having the following structure:

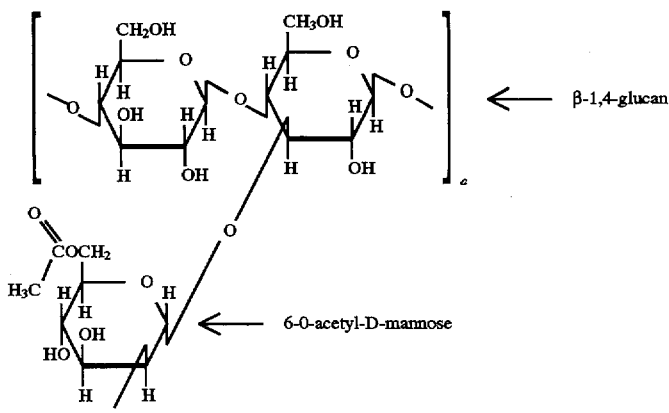

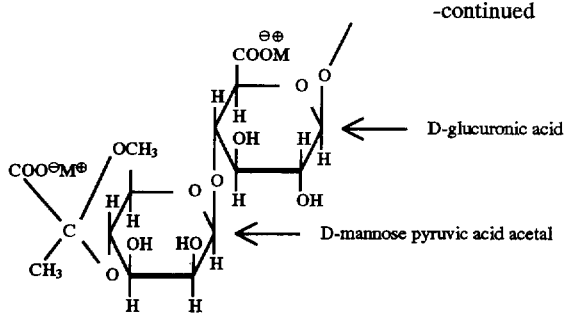

← D-glucuronic acid

← D-mannose pyruvic acid acetal

The basecoat compositions according to the invention may also contain further conventional additives such as fillers, plasticizers, stabilizers, wetting agents, dispersants, flow-out agents, antifoams and catalysts in the customary amounts, either singly or in a mixture.

After applying the basecoat compositions, a suitable transparent topcoat composition is applied after a brief flash-off period without a baking stage. Clearcoats containing conventional solvents, water-dilutable clear-coats or powder clearcoats may be applied.

The basecoat and the topcoat are finally baked together.

The invention also relates to water-dilutable coating compositions which are suitable for the production of the basecoat of two layer coatings of the basecoat/clear-coat type and which contain water, organic solvents if appropriate, a water-dilutable binder, crosslinked polymeric microparticles of a diameter of 0.01 to 10 µm, pigment particles and a thickener, which contains 0.1 to 4.0% by weight, preferably 1.0 to 2.0% by weight, based on the binder solids, of xanthan gum and 5 to 80% by weight, preferably 30 to 70% by weight, particularly preferably 40 to 60% by weight, based on the binder solids, of crosslinked polymeric microparticles, the crosslinked polymeric microparticles being obtainable (a) by dispersing a mixture of a component (A) and a component (B) in an aqueous medium, wherein
the component (A) consists of one or more polyester polyol(s) containing at least two hydroxyl groups and
the component (B) consists of one or more optionally blocked polyisocyanate compound(s),
the components (A) and/or (B) possessing a sufficient number of ionic groups to form a stable dispersion and at least a part of the components (A) and/or (B) containing more than two hydroxyl or optionally blocked isocyanate groups per molecule, and (b) by subsequently heating the resultant dispersion to a temperature high enough for the components (A) and (B) to react with the formation of crosslinked polymeric microparticles.

For a more detailed description of the coating compositions according to the invention see pages 5 to 18 of this description.

Suitable substrates to be coated are particularly pretreated metal substrates; however, non-pretreated metals and any other substrates, such as, for example, wood/plastics etc, may be coated with a multicoat, protective and/or decorative coating using the basecoat compositions according to the invention.

The invention is explained in greater detail in the examples below. All parts and percentages are by weight unless expressly stated otherwise.

1. Preparation of a water-dilutable binder 1.1 832 parts of neopentyl glycol are weighed into a reaction vessel fitted with a stirrer, a thermometer and a packed column, and melted. 664 parts of isophthalic acid are then added and the reaction mixture is heated with stirring in such a manner that the temperature at the head of the column does not exceed 100° C. and the reaction temperature does not exceed 220° C. On reaching an acid value of 8.5 the reaction mixture is cooled to 180° C. and 384 parts of trimellitic anhydride are added. Esterification is then continued until an acid value of 39 is reached. The reaction mixture is finally diluted with 722 parts of butyl glycol. A 70% solution of polyester resin is obtained which can be diluted with water after neutralization with an amine.

2. Preparation of an aqueous dispersion of the crosslinked polymeric microparticles used according to the invention 2.1 Preparation of a polyester polyol 281 parts of hexane-1,6-diol and 179 parts of isophthalic acid are weighed into a 4-necked flask fitted with a stirrer, a thermometer, a gas inlet tube and a packed column. A slow stream of nitrogen is passed through the stirred reaction mixture which is heated in such a manner that the temperature at the head of the column does not exceed 100° C. and the reaction temperature does not exceed 220° C. When the acid value has dropped to below 10, the reaction mixture is cooled to 150° C. and 206 parts of trimellitic anhydride are added. The reaction mixture is then heated again in such a manner that the temperature at the head of the column does not exceed 100° C. and the reaction temperature does not exceed 170° C. As soon as an acid value of 45 has been reached, the reaction mixture is cooled and diluted with 253 parts of methyl ethyl ketone. The solids content of the resultant solution is 75% by weight.

2.2 Preparation of a blocked polyisocyanate 1998 parts (9 mole) of isophoronediisocyanate are dissolved in 1200 parts of anhydrous methyl ethyl ketone in a round-bottomed flask fitted with a reflux condenser, a stirrer and a thermometer, and 3 parts of dibutyltin dilaurate are added. After heating the reaction mixture to 70° C. 150 parts of trimethylolpropane are added and the reaction mixture is kept at 70° C. for 1 hour. A further 252 parts of trimethylolpropane are then added in portions. The resultant intermediate (NCO content: 9.6%) is treated with 922 parts of diethyl malonate and 7.1 parts of sodium phenate. The reaction mixture is kept at 70° C. for 4 hours. The NCO content of the end product is 1.97%. After the addition of 500 parts of methyl ethyl ketone a 48% solution is obtained.

2.3 Preparation of a dispersion of crosslinked polymeric microparticles 1558 parts of the polyester polyol solution prepared by the above procedure (compare 2.1) and 1208 parts of the blocked polyisocyanate prepared by the above procedure (compare 2.2) are weighed into a cylindrical twin-jacketed glass reaction vessel fitted with a stirrer, a thermometer, a reflux condenser and a feed vessel, and diluted with 426 parts of methyl ethyl ketone. The mixture is then heated to 50° C. and after about 1 hour a mixture of 3385 parts of deionized water and 56 parts of dimethylethanolamine is added with stirring. The methyl ethyl ketone is distilled off in vacuo at about 50° C. to produce an aqueous dispersion containing non-crosslinked particles. The solids content of the dispersion is 35% by weight. To prepare the crosslinked polymeric microparticles, the thus prepared dispersion is heated to 90° C. in the course of 1 hour. About 2 hours after the temperature of 90° C. has been reached, the viscosity begins to rise. During a further 2 hours enough water is constantly added to allow efficient mixing. A total of 7285 parts of water are added with the result that the solids content of the dispersion drops to 15% by weight. The pH of the resultant dispersion is adjusted to 7.3 with the aid of a 10% aqueous solution of dimethylethanolamine. Viscosity measured in a DIN-4 cup: 25 seconds. Measurements using a Haake rotary viscometer RV 100 indicate that the dispersion possesses a high measure of structural viscosity (pseudoplasticity).

It is not possible to convert the dispersion to a solution by the addition of large amounts of tetrahydrofuran, dimethylformamide or N-methylpyrrolidone. This points to the presence of crosslinked polymeric microparticles.

3. Preparation and application of a basecoat composition according to the invention A basecoat composition having the following composition is prepared by generally known methods:

| | |
|---|---|
| Polyester resin solution in accordance with procedure 1.1 | 4.0 |
| Dispersion of polymeric microparticles in accordance with procedure 2.3 | 51.1 |
| Cymel 325[a] | 5.0 |
| Butylglycol | 8.9 |
| Dimethylethanolamine (10% in water) | 2.9 |
| Aluminum paste (65% of aluminum) | 3.3 |
| Rhodopol 50 MD[b] (2% in water) | 10.8 |
| Water | 14.0 |
| | 100.0 |

[a] melamine-formaldehyde resin etherified with methanol, commercial product of Dyno-Cyanamid
[b] xanthan gum (molecular mass about $2 \times 10^6$) commercial product of Rhône-Poulenc The resultant metallic basecoat has a pH of 7.7 and a viscosity which can no longer be measured in a DIN-4 cup. Despite its high viscosity, the basecoat may be readily applied, for example by air atomization, on account of its strongly structurally viscous (pseudoplastic) flow characteristics.

This basecoat was used to prepare two layer metallic coatings by the customary wet-on-wet process. These coatings showed an excellent metallic effect and a very good clearcoat condition.

Compared with a basecoat from the same binder without xanthan gum, the novel coatings had an improved metallic effect and a strongly reduced tendency to running on vertical surfaces was found.

We claim:

1. A water-dilutable coating composition for the production of a basecoat of a two layer coating of the basecoat/clearcoat type comprising: a pseudoplastic or thixotropic water-dilutable basecoat composition comprising water, a water-dilutable binder, crosslinked polymeric microparticles with a diameter of 0.01 to 10 μm, pigment particles and a thickener, said composition containing 0.1 to 4.0% by weight based on the binder solids weight, of xanthan gum and 5 to 80% by weight based on the binder solids weight, of crosslinked polymeric microparticles, the crosslinked polymeric microparticles being obtained (a) by dispersing a mixture of a component (A) and a component (B) in an aqueous medium, the component (A) comprising one or more polyester polyols containing at least two hydroxyl groups and the component (B) comprising one or more polyisocyanate compounds, the component (A) or (B) possessing a sufficient number of ionic groups to form a stable dispersion and at least a part of the components (A) or (B) containing more than two hydroxyl or isocyanate groups per molecule, and (b) by subsequently heating the resultant dispersion to a temperature high enough for the components (A) and (B) to react with the formation of crosslinked polymeric microparticles.

2. A water dilutable coating composition as claimed in claim 1 wherein the composition contains an organic solvent.

3. A water-dilutable coating composition as claimed in claim 1 wherein the polyisocyanate compounds of step (a)(i) are partially blocked.

4. A water-dilutable coating composition as claimed in claim 1 wherein the basecoat composition contains 1.0 to 2.0% by weight of the xanthan gum.

5. A water-dilutable coating composition as claimed in claim 1 wherein the basecoat composition contains 30 to 70% by weight of crosslinked polymeric microparticles.

6. A water-dilutable coating composition as claimed in claim 1 wherein the basecoat composition contains 40 to 60% by weight of crosslinked polymeric microparticles.

7. A water-dilutable coating composition as claimed in claim 1, which contain a mixture of a water-dilutable melamine resin and a water-dilutable polyester resin as water-dilutable binder.

8. The water-dilutable coating composition of claim 1 wherein the basecoat composition contains metallic pigment particles.

9. A process for the production of a multicoat protective or decorative coating on a substrate surface comprising the steps of:

(a) preparing a pseudoplastic or thixotropic water-dilutable basecoat composition comprising water, water-dilutable binder solids, about 0.1 to 4.0% by weight, based on the weight of the binder solids, of xanthan gum, about 5 to 80% by weight, based on the weight of the binder solids, of crosslinked polymeric microparticles having a diameter of 0.01 to 10 μm, and pigment particles, wherein said crosslinked polymeric microparticles are prepared by (i) dispersing a mixture of a component (A) and a component (B) in an aqueous medium, the component (A) comprising at least one polyester polyol containing at least two hydroxyl groups and the component (B) comprising at least one polyisocyanate compound, said component (A) or (B) having available a number of ionic groups sufficient to form a stable dispersion and at least a part of the components (A) and (B) containing more than two hydroxyl or isocyanate groups, respectively, per molecule, and (ii) by subsequently heating the resultant dispersion to a temperature sufficiently high for the components (A) and (B) to react to form crosslinked polymeric microparticles;

(b) coating the substrate surface with the basecoat composition of step (a);

(c) applying a transparent topcoat composition to the basecoat composition of step (b); and (d) baking the basecoat and the topcoat together.

10. A water dilutable coating composition as produced by the process of claim 9 wherein the polyisocyanate compounds of step (a)(i) are partially blocked.

11. A water dilutable coating composition as produced by the process of claim 9 wherein the basecoat composition contains 1.0 to 2.0% by weight of the xanthan gum.

12. A water dilutable coating composition as produced by the process of claim 9 wherein the basecoat composition contains 30 to 70% by weight of crosslinked polymeric microparticles.

13. A water dilutable coating composition as produced by the process of claim 9 wherein the basecoat composition contains 40 to 60% by weight of crosslinked polymeric microparticles.

14. A water dilutable coating composition as produced by the process of claim 9 wherein the water-dilutable basecoat composition contains an organic solvent.

15. The process as claimed in claim 9, wherein the basecoat composition contains a mixture of a water-dilutable melamine resin and a water-dilutable polyester resin as water-dilutable binder.

16. A process as claimed in claim 9 wherein the polyisocyanate compounds of step (a)(i) are partially blocked.

17. A process as claimed in claim 9 wherein the basecoat composition contains 1.0 to 2.0% by weight of the xanthan gum.

18. A process as claimed in claim 9 wherein the basecoat composition contains 30 to 70% by weight of crosslinked polymeric microparticles.

19. A process as claimed in claim 9 wherein the basecoat composition contains 40 to 60% by weight of crosslinked polymeric microparticles.

20. A process as claimed in claim 9 wherein the composition contains an organic solvent.

21. The process according to claim 9 wherein the basecoat composition contains metallic pigment particles.

* * * * *